US009221210B2

(12) United States Patent
Wu et al.

(10) Patent No.: US 9,221,210 B2
(45) Date of Patent: Dec. 29, 2015

(54) METHOD TO CREATE VACUUM INSULATED CABINETS FOR REFRIGERATORS

(71) Applicant: Whirlpool Corporation, Benton Harbor, MI (US)

(72) Inventors: Guolian Wu, Saint Joseph, MI (US); Nihat Cur, Saint Joseph, MI (US); Jurgen Pannock, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 438 days.

(21) Appl. No.: 13/833,685

(22) Filed: Mar. 15, 2013

(65) Prior Publication Data

US 2013/0270732 A1    Oct. 17, 2013

Related U.S. Application Data

(60) Provisional application No. 61/622,821, filed on Apr. 11, 2012.

(51) Int. Cl.
*B29C 51/02* (2006.01)
*B29C 51/06* (2006.01)
*B29L 31/00* (2006.01)
*B29C 51/08* (2006.01)

(52) U.S. Cl.
CPC ............... *B29C 51/02* (2013.01); *B29C 51/06* (2013.01); *B29C 51/082* (2013.01); *B29C 2791/001* (2013.01); *B29L 2031/7622* (2013.01)

(58) Field of Classification Search
CPC ........ B29C 51/02; B29C 51/06; B29C 51/08; B29C 51/082; B29C 51/085; B29C 51/087
See application file for complete search history.

(56) References Cited

U.S. PATENT DOCUMENTS

| | | | |
|---|---|---|---|
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,439,602 A | 4/1948 | Heritage |

(Continued)

FOREIGN PATENT DOCUMENTS

| | | |
|---|---|---|
| CA | 1320631 | 7/1993 |
| CA | 2259665 | 1/1998 |

(Continued)

OTHER PUBLICATIONS

Euopean Patent Application No. 14158608.1 filed Mar. 10, 2014, Applicant: Whirlpool Corporation, European Search re: same, mail date: Oct. 14, 2014, 5 pages.

(Continued)

*Primary Examiner* — Ryan Ochylski

(57) ABSTRACT

A method of forming a vacuum insulated refrigerator cabinet, the method comprising providing first and second sheets of material. The first sheet of material is thermoformed over a first forming tool forming a first intermediate structure. The first intermediate structure is then thermoformed over a second forming mold to create a second intermediate structure. The second sheet of material is then sealing connected with the second intermediate structure forming an annular space. A vacuum is created in the annular space creating a vacuum insulated cabinet.

20 Claims, 3 Drawing Sheets

(56) References Cited

U.S. PATENT DOCUMENTS

| | | | |
|---|---|---|---|
| 2,439,603 A | 4/1948 | Heritage | |
| 2,559,356 A | 7/1951 | Hedges | |
| 2,768,046 A | 10/1956 | Evans | |
| 2,817,123 A | 12/1957 | Jacobs | |
| 2,985,075 A | 5/1961 | Knutsson-Hall | |
| 3,125,388 A | 3/1964 | Costantini et al. | |
| 3,137,900 A | 6/1964 | Carbary | |
| 3,258,883 A | 7/1966 | Campanaro et al. | |
| 3,358,059 A | 12/1967 | Snyder | |
| 3,379,481 A | 4/1968 | Fisher | |
| 3,635,536 A | 1/1972 | Lackey et al. | |
| 3,688,384 A | 9/1972 | Mizushima et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherburn | |
| 4,332,429 A | 6/1982 | Frick et al. | |
| 4,417,382 A | 11/1983 | Schilf | |
| 4,660,271 A | 4/1987 | Lenhardt | |
| 4,671,985 A | 6/1987 | Rodrigues et al. | |
| 4,805,293 A | 2/1989 | Buchser | |
| 4,917,841 A | 4/1990 | Jenkins | |
| 5,007,226 A | 4/1991 | Nelson | |
| 5,033,636 A | 7/1991 | Jenkins | |
| 5,066,437 A | 11/1991 | Barito et al. | |
| 5,082,335 A | 1/1992 | Cur et al. | |
| 5,175,975 A | 1/1993 | Benson et al. | |
| 5,221,136 A | 6/1993 | Hauck et al. | |
| 5,248,196 A | 9/1993 | Lynn et al. | |
| 5,252,408 A | 10/1993 | Bridges et al. | |
| 5,263,773 A | 11/1993 | Gable et al. | |
| 5,273,801 A | 12/1993 | Barry et al. | |
| 5,359,795 A | 11/1994 | Mawby et al. | |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,586,680 A | 12/1996 | Dellby et al. | |
| 5,632,543 A | 5/1997 | McGrath et al. | |
| 5,640,828 A | 6/1997 | Reeves et al. | |
| 5,652,039 A | 7/1997 | Tremain et al. | |
| 5,716,581 A | 2/1998 | Tirrell et al. | |
| 5,759,591 A * | 6/1998 | Rhoades et al. | 425/387.1 |
| 5,827,385 A | 10/1998 | Meyer et al. | |
| 5,843,353 A | 12/1998 | De Vos et al. | |
| 5,866,228 A | 2/1999 | Awata | |
| 5,868,890 A * | 2/1999 | Fredrick | 156/214 |
| 5,900,299 A | 5/1999 | Wynne | |
| 5,924,295 A | 7/1999 | Park | |
| 5,958,326 A * | 9/1999 | Caferro | 264/550 |
| 5,985,189 A | 11/1999 | Lynn et al. | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,164,030 A | 12/2000 | Dietrich | |
| 6,187,252 B1 * | 2/2001 | Rhoades et al. | 264/545 |
| 6,220,473 B1 | 4/2001 | Lehman et al. | |
| 6,224,179 B1 | 5/2001 | Wenning et al. | |
| 6,260,377 B1 | 7/2001 | Tamaoki et al. | |
| 6,305,768 B1 | 10/2001 | Nishimoto | |
| 6,375,778 B1 * | 4/2002 | Cremades Schulz et al. | 156/212 |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,460,955 B1 | 10/2002 | Vaughan et al. | |
| 6,623,413 B1 | 9/2003 | Wynne | |
| 6,773,082 B2 | 8/2004 | Lee | |
| 6,938,968 B2 | 9/2005 | Tanimoto et al. | |
| 6,997,530 B2 | 2/2006 | Avendano et al. | |
| 7,210,308 B2 | 5/2007 | Tanimoto et al. | |
| 7,278,279 B2 | 10/2007 | Hirai et al. | |
| 7,284,390 B2 | 10/2007 | Van Meter et al. | |
| 7,296,432 B2 | 11/2007 | Muller et al. | |
| 7,316,125 B2 | 1/2008 | Uekado et al. | |
| 7,343,757 B2 | 3/2008 | Egan et al. | |
| 7,517,576 B2 | 4/2009 | Echigoya et al. | |
| 7,537,817 B2 | 5/2009 | Tsunetsugu et al. | |
| 7,641,298 B2 | 1/2010 | Hirath et al. | |
| 7,762,634 B2 | 7/2010 | Tenra et al. | |
| 7,815,269 B2 | 10/2010 | Wenning et al. | |
| 7,861,538 B2 | 1/2011 | Welle et al. | |
| 7,886,559 B2 | 2/2011 | Hell et al. | |
| 7,908,873 B1 | 3/2011 | Cur et al. | |
| 7,930,892 B1 | 4/2011 | Vonderhaar | |
| 8,113,604 B2 | 2/2012 | Olson et al. | |
| 8,117,865 B2 | 2/2012 | Allard et al. | |
| 8,202,599 B2 | 6/2012 | Henn | |
| 8,281,558 B2 | 10/2012 | Hiemeyer et al. | |
| 8,353,177 B2 | 1/2013 | Adamski et al. | |
| 8,790,477 B2 | 7/2014 | Tenra et al. | |
| 8,881,398 B2 | 11/2014 | Hanley et al. | |
| 8,927,084 B2 | 1/2015 | Jeon et al. | |
| 2002/0168496 A1 | 11/2002 | Morimoto et al. | |
| 2003/0008100 A1 | 1/2003 | Horn | |
| 2004/0178707 A1 | 9/2004 | Avendano et al. | |
| 2004/0180176 A1 | 9/2004 | Rusek, Jr. | |
| 2004/0253406 A1 | 12/2004 | Hayashi et al. | |
| 2005/0235682 A1 | 10/2005 | Hirai et al. | |
| 2006/0076863 A1 | 4/2006 | Echigoya et al. | |
| 2006/0201189 A1 | 9/2006 | Adamski et al. | |
| 2006/0263571 A1 | 11/2006 | Tsunetsugu et al. | |
| 2007/0001563 A1 * | 1/2007 | Park et al. | 312/406 |
| 2007/0099502 A1 | 5/2007 | Ferinauer et al. | |
| 2008/0309210 A1 | 12/2008 | Luisi et al. | |
| 2009/0056367 A1 | 3/2009 | Neumann | |
| 2009/0058244 A1 | 3/2009 | Cho et al. | |
| 2009/0113925 A1 | 5/2009 | Korkmaz | |
| 2009/0179541 A1 | 7/2009 | Smith et al. | |
| 2009/0324871 A1 | 12/2009 | Henn | |
| 2010/0293984 A1 | 11/2010 | Adamski et al. | |
| 2010/0295435 A1 | 11/2010 | Kendall et al. | |
| 2011/0030894 A1 | 2/2011 | Tenra et al. | |
| 2011/0146335 A1 | 6/2011 | Jung et al. | |
| 2011/0165367 A1 | 7/2011 | Kojima et al. | |
| 2011/0241513 A1 | 10/2011 | Nomura et al. | |
| 2011/0241514 A1 | 10/2011 | Nomura et al. | |
| 2011/0260351 A1 | 10/2011 | Corradi et al. | |
| 2011/0290808 A1 | 12/2011 | Bai et al. | |
| 2011/0315693 A1 | 12/2011 | Cur et al. | |
| 2012/0000234 A1 | 1/2012 | Adamski et al. | |
| 2012/0103006 A1 | 5/2012 | Jung et al. | |
| 2012/0104923 A1 | 5/2012 | Jung et al. | |
| 2012/0118002 A1 | 5/2012 | Kim et al. | |
| 2012/0137501 A1 | 6/2012 | Allard et al. | |
| 2012/0231204 A1 | 9/2012 | Jeon et al. | |
| 2012/0237715 A1 | 9/2012 | McCracken | |
| 2012/0273111 A1 | 11/2012 | Nomura et al. | |
| 2012/0279247 A1 | 11/2012 | Katu et al. | |
| 2012/0285971 A1 | 11/2012 | Junge et al. | |
| 2012/0297813 A1 | 11/2012 | Hanley et al. | |
| 2012/0324937 A1 | 12/2012 | Adamski et al. | |
| 2013/0255304 A1 | 10/2013 | Cur et al. | |
| 2013/0256318 A1 | 10/2013 | Kuehl et al. | |
| 2013/0256319 A1 | 10/2013 | Kuehl et al. | |
| 2013/0257256 A1 | 10/2013 | Allard et al. | |
| 2013/0257257 A1 | 10/2013 | Cur et al. | |
| 2013/0305535 A1 | 11/2013 | Cur et al. | |
| 2014/0260332 A1 | 9/2014 | Wu | |

FOREIGN PATENT DOCUMENTS

| | | |
|---|---|---|
| CN | 1158509 | 7/2004 |
| CN | 1970185 | 5/2007 |
| CN | 100359272 | 1/2008 |
| CN | 201680116 U | 12/2010 |
| CN | 102452522 | 5/2012 |
| DE | 19818890 A1 | 11/1999 |
| DE | 102010024951 | 12/2011 |
| EP | 0260699 A2 | 3/1988 |
| EP | 1087186 A2 | 3/2001 |
| EP | 1200785 | 5/2002 |
| EP | 1243880 A1 | 9/2002 |
| EP | 1496322 A1 | 1/2005 |
| EP | 1505359 | 2/2005 |

(56) References Cited

FOREIGN PATENT DOCUMENTS

| | | |
|---|---|---|
| EP | 2342511 A2 | 7/2011 |
| FR | 2980963 A1 | 4/2013 |
| GB | 837929 | 6/1960 |
| GB | 1214548 | 12/1970 |
| JP | 73028353 | 8/1973 |
| JP | 51057777 | 5/1976 |
| JP | S59191588 U | 12/1984 |
| JP | 403013779 A | 1/1991 |
| JP | 406159922 A | 6/1994 |
| JP | 7001479 A | 1/1995 |
| JP | 08300052 | 11/1996 |
| JP | 10113983 A | 5/1998 |
| JP | 11336990 A | 12/1999 |
| JP | 2000097390 A | 4/2000 |
| JP | 2000117334 | 4/2000 |
| JP | 2001343176 | 12/2001 |
| JP | 03478771 | 12/2003 |
| JP | 2004303695 | 10/2004 |
| JP | 2005164193 | 6/2005 |
| JP | 2007263186 A | 10/2007 |
| JP | 2009162402 | 7/2009 |
| JP | 2010017437 A | 1/2010 |
| JP | 2010108199 A | 5/2010 |
| JP | 2010145002 | 7/2010 |
| JP | 04545126 B2 | 9/2010 |
| JP | 2010236770 | 10/2010 |
| JP | 2010276309 | 12/2010 |
| JP | 2011002033 A | 1/2011 |
| JP | 2011196644 | 10/2011 |
| JP | 2012026493 A | 2/2012 |
| JP | 04897473 B2 | 3/2012 |
| JP | 2012063029 A | 3/2012 |
| JP | 2012087993 | 5/2012 |
| JP | 2012163258 A | 8/2012 |
| JP | 2012242075 | 12/2012 |
| JP | 2013050242 A | 3/2013 |
| JP | 2013088036 A | 5/2013 |
| KR | 20020057547 A | 7/2002 |
| KR | 20040000126 | 1/2004 |
| KR | 1020080103845 A | 11/2008 |
| KR | 20120007241 A | 1/2012 |
| KR | 2012046621 A | 5/2012 |
| KR | 2012051305 A | 5/2012 |
| WO | 2010043009 A2 | 4/2010 |
| WO | WO2010092627 | 8/2010 |
| WO | WO2011003711 | 1/2011 |
| WO | 2011081498 A2 | 7/2011 |
| WO | 2012023705 A2 | 2/2012 |
| WO | WO2012026715 | 3/2012 |

OTHER PUBLICATIONS

International Patent Application No. PCT/US2013036203, filing date: Apr. 11, 2013, Applicant: Whirlpool Corporation, International Search Report and Opinion mail date: Jul. 26, 2013, 10 pages.
International Patent Application No. PCT/US2013036203, filing date: Apr. 11, 2013, Applicant: Whirlpool Corporation. International Search Report and Opinion mail date: Jul. 26, 2013.
European Search Report, Application No. 4158615.6, Jun. 24, 2015, 5 pages.

* cited by examiner (TRADITIONAL REFRIGERATOR CABINET CONSTRUCTION)

(TRADITIONAL REFRIGERATOR CABINET CONSTRUCTION)

(TRADITIONAL REFRIGERATOR CABINET CONSTRUCTION)

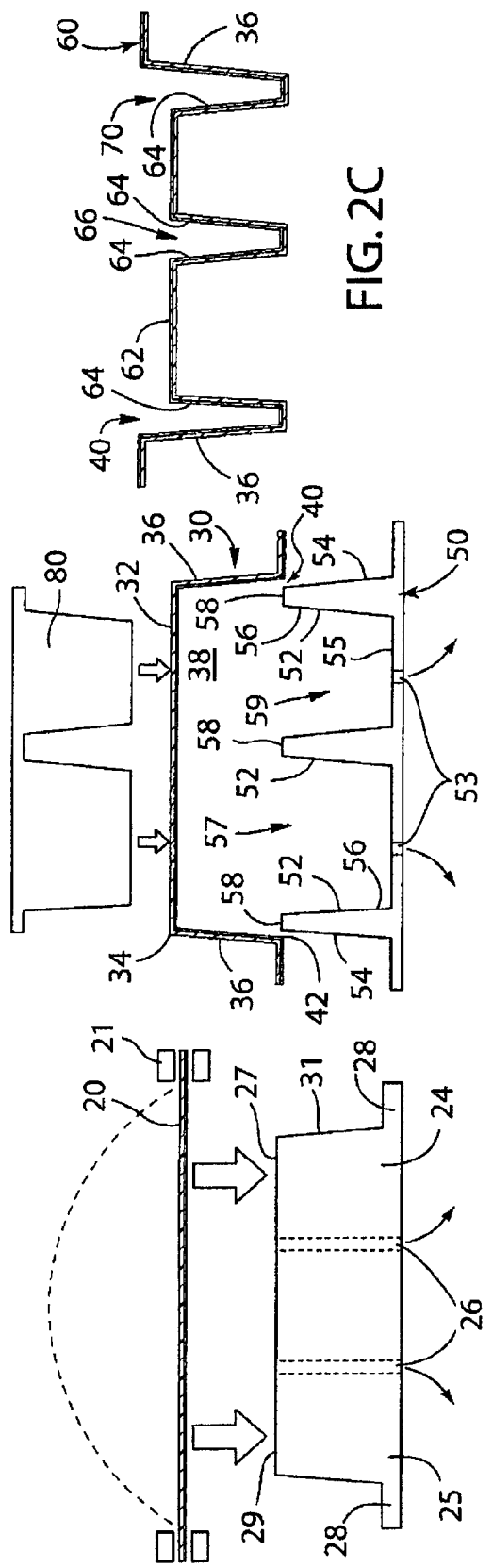
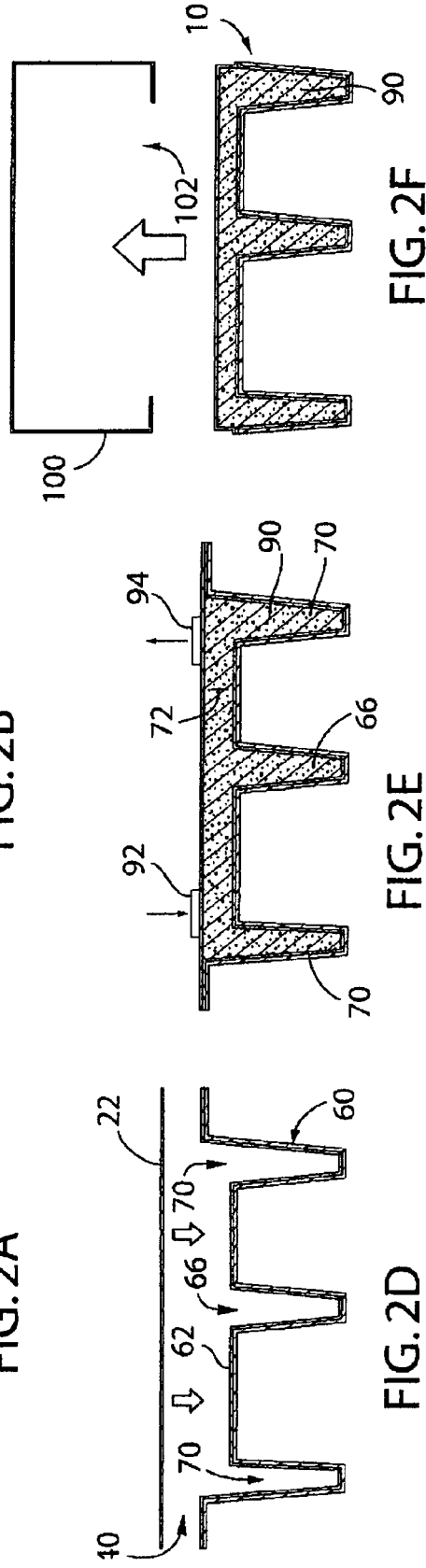
FIG. 2A  FIG. 2B  FIG. 2C  FIG. 2D  FIG. 2E  FIG. 2F

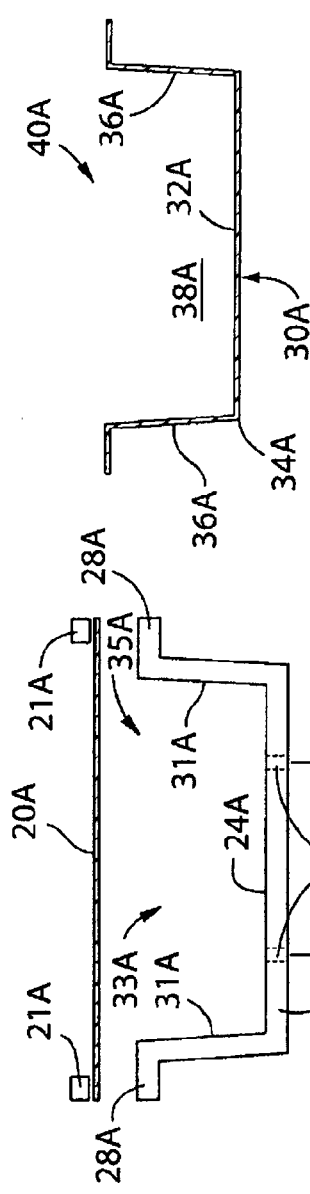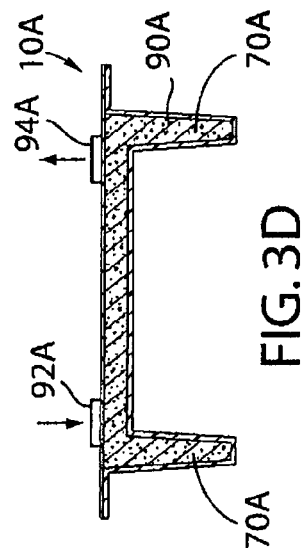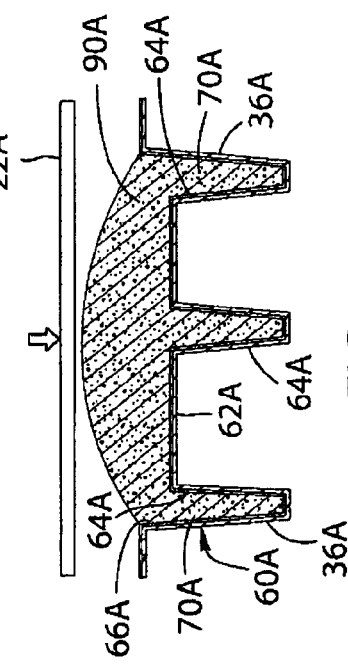

METHOD TO CREATE VACUUM INSULATED CABINETS FOR REFRIGERATORS

CROSS-REFERENCE TO RELATED APPLICATIONS

The present application is related to U.S. Pat. No. 9,140,481, issued Sep. 22, 2015, entitled FOLDED VACUUM INSULATED STRUCTURE; and U.S. Pat. No. 8,944,541, issued Feb. 3, 2015, entitled VACUUM PANEL CABINET STRUCTURE FOR A REFRIGERATOR; and U.S. Pat. No. 9,182,158, issued Nov. 10, 2015, entitled DUAL COOLING SYSTEMS TO MINIMIZE OFF-CYCLE MIGRATION LOSS IN REFRIGERATORS WITH A VACUUM INSULATED STRUCTURE; and U.S. Pat. No. 9,038,403, issued May 26, 2015, entitled VACUUM INSULATED DOOR STRUCTURE AND METHOD FOR THE CREATION THEREOF; and U.S. Pat. No. 9,071,907, issued Jun. 30, 2015, entitled VACUUM INSULATED STRUCTURE TUBULAR CABINET CONSTRUCTION; and U.S. Pat. No. 8,986,483, issued Mar. 24, 2015, entitled FOLDED VACUUM INSULATED STRUCTURE, all of which are incorporated herein by reference in their entirety.

The present application claims priority to and the benefit of U.S. Provisional Application Ser. No. 61/622,821, filed Apr. 11, 2012, entitled VACUUM INSULATED CABINETS FOR HOUSEHOLD REFRIGERATORS, the entire disclosure of which is hereby incorporated by reference.

FIELD OF THE INVENTION

The present invention generally relates to a vacuum insulated cabinet and the method for constructing therefore.

BACKGROUND OF THE INVENTION

Known plastic liner forming processes, as shown in traditional refrigerator cabinet construction FIGS. 1A-1C, the plastic sheet does not have an impermeable layer to provide a sufficient barrier for a vacuum insulated cabinet. In current refrigerator cabinet versions an manufacturing an insulated refrigerator cabinet, as shown in FIGS. 1A-1C, a material sheet 12 having a single layer plastic is thermoformed over a first forming tool 11 to create a first intermediate structure 15. A steel sheet wrapper 13 is then fitted over the first intermediate structure 15 to create an annular space 16. The annular space 16 is filled with insulation material 14 by any conventional means. The current insulation used in the refrigerator cabinet is polyurethane foam blown into the cavity between the plastic liner and the metal wrapper.

SUMMARY OF THE INVENTION

One aspect of the present invention includes a method of forming a vacuum insulated refrigerator cabinet providing first and second sheets of material comprising at least a first layer of thermal plastic material that is at least partially permeable to nitrogen and oxygen and the second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure having a base sidewall defining a generally quadrilateral perimeter and four first sidewalls extending transversely from the quadrilateral perimeter to define a cavity having an opening that opens in a first direction and defines a peripheral edge extending around the opening. A second forming tool is provided having sidewall portions defining four generally rectangular outwardly facing surfaces and four generally rectangular inwardly facing surfaces, and an end surface extending transversely between the inwardly and outwardly facing surfaces. The first intermediate structure is disengaged from the first forming tool followed by positioning the second forming tool into the cavity of the first intermediate structure. The base sidewalls are plastically deformed to form a second intermediate structure having a base sidewall and four inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge to substantially close off the opening. A vacuum is formed in the annular space with an appropriate porous, thermally insulating material such as fumed silica compacted and placed in the annular space to withstand atmospheric pressure and to provide superior thermal insulation properties.

Another aspect of the present invention includes a method of forming a vacuum insulated refrigerator cabinet providing first and second sheets of material comprising at least a first layer of thermoplastic material and a second layer of material. At least a portion of the first sheet of material is heated to a temperature at which the first sheet of material can be plastically deformed. A first forming tool is utilized to deform the first sheet of material and form a first intermediate structure having the base sidewall defining a generally quadrilateral perimeter and at least one first side wall extending transversely from the quadrilateral perimeter to define a cavity having an opening that opens in a first direction and defines a peripheral edge extending around the opening. A second forming tool is provided having sidewall portions defining a plurality of generally rectangular outwardly facing surfaces and a plurality of generally rectangular inwardly facing surfaces, and an end surface extending transversely between the inwardly and outwardly facing surfaces. The first intermediate part is disengaged from the first forming tool followed by positioning the second forming tool in the cavity of the first intermediate structure. The base sidewall is plastically deformed to form a second intermediate structure having a base sidewall and a plurality of inner sidewalls extending transversely from the base sidewall and defining a second cavity that opens in a second direction that is substantially opposite the first direction. The inner sidewalls are spaced apart inwardly from the first sidewalls to define an annular space that opens in the first direction. The second sheet of material is sealingly connected to the second intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

Yet another aspect of the present invention includes the method for forming a vacuum insulated refrigerator cabinet providing first and second sheets of material comprising at least a first layer of thermal plastic material that is at least partially permeable to oxygen, nitrogen and water vapor, and a second layer of material that is substantially impermeable to oxygen, nitrogen and water vapor. At least a portion of the first sheet of material is heated to a temperature at which the first sheet of material can be plastically deformed. A first forming tool is utilized to deform the first sheet of material and form a first intermediate structure which defines a cavity having an opening that opens in a first direction and defines a peripheral edge extending around the opening. A second forming tool is also provided. The first intermediate part is disengaged from the first forming tool followed by positioning the second forming tool in the cavity of the first intermediate structure. A base sidewall is plastically deformed in order to form a second intermediate structure having a base sidewall and a plurality of inner sidewalls extending transversely from the base sidewall and defining a second cavity that opens in the second direction substantially opposite the first direction. The inner sidewalls are spaced apart inwardly from the first sidewalls to define an annular space that opens in the first direction. The second sheet of material is sealingly connected to the intermediate structure around the peripheral edge in order to substantially close off the opening. A vacuum is formed in the annular space with an appropriate porous, thermally insulating material such as fumed silica compacted and placed in the annular space to withstand atmospheric pressure and to provide superior thermal insulation properties.

These and other features, advantages, and objects of the present invention will be further understood and appreciated by those skilled in the art by reference to the following specification, claims, and appended drawings.

BRIEF DESCRIPTION OF THE DRAWINGS

FIG. 2A is a side plan view of a method according to the present invention;

FIG. 2B is a side plan view of the method of the present invention;

FIG. 2C is a side plan view of the method of the present invention;

FIG. 2D is a side plan view of the method of the present invention;

FIG. 2E is a side plan view of the method of the present invention;

FIG. 2F is a side plan view of the method of the present invention;

FIG. 3A is a side plan view of another embodiment of the present invention;

FIG. 3B is a side plan view of the method of the present invention shown in FIG. 3;

FIG. 3C is a side plan view of the method of the present invention shown in FIG. 3;

FIG. 3D is a side plan view of the method of the present invention shown in FIG. 3; and FIG. 4 is a side plan view of yet another embodiment of the method of the present invention.

DETAILED DESCRIPTION

Figure 1A:
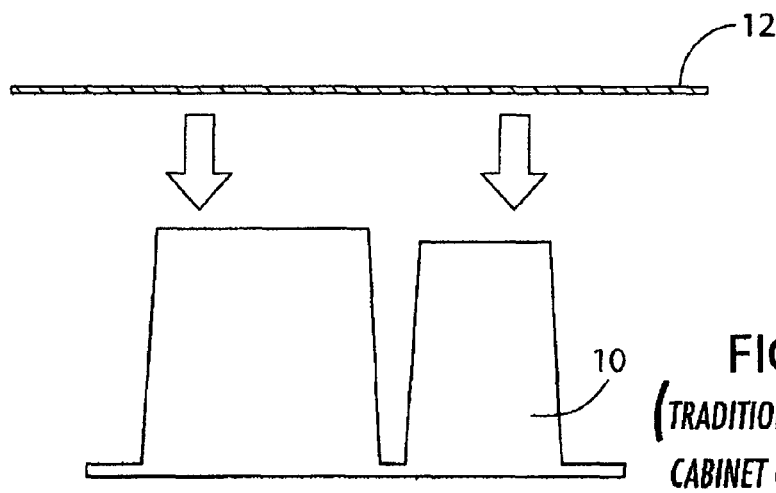
FIG. 1A is a side plan view of a prior art version of a vacuum insulated cabinet.
Figure 1B:
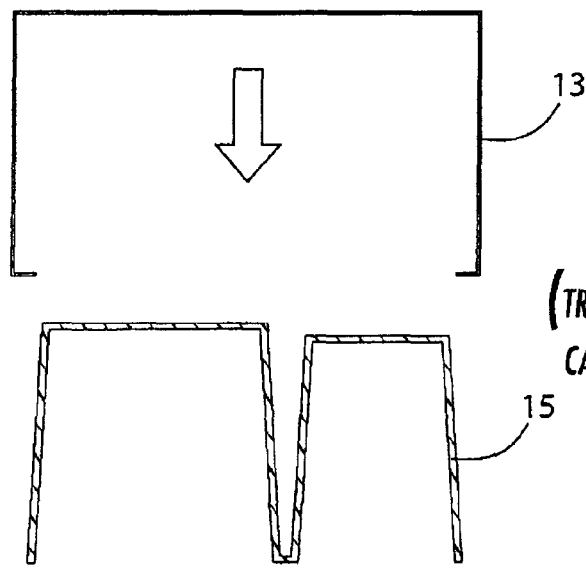
FIG. 1B is a side plan view of a prior art version of a vacuum insulated cabinet.
Figure 1C:
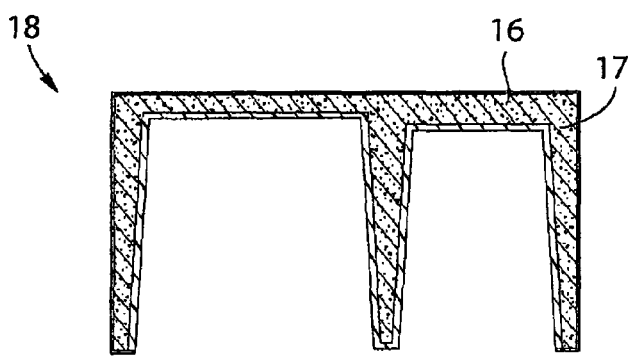
FIG. 1C is a side plan view of prior art version of a vacuum insulated refrigerator cabinet.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

FIGS. 2A-2F show a method of forming a vacuum insulated cabinet 10 according to the present invention. FIG. 2A shows a first forming tool 24 having a generally quadrilateral perimeter formed from a base wall 29 and a plurality of sidewalls 31 with a flange 28 extending from a bottom portion 25 of the quadrilateral perimeter. The first forming tool 24 may further include at least one vacuum channel 26. FIG. 2A also shows a first material sheet 20. The first material sheet 20 is typically comprised of a first layer of thermoplastic material that is partially permeable to oxygen, nitrogen and water vapor and a second layer of material that is substantially impermeable to oxygen, nitrogen and water vapor. A typical plastic composite used in this process is a first layer of high impact polystyrene (HIPS) food grade, specially tailored for refrigeration products and a second impermeable layer of EVOH. One exemplary embodiment uses Polystyrol 2710 by BASF and Edistr RR740E by Polimeri Europa as the first layer.

The first material sheet 20 is first softened typically using heat until the first material sheet 20 reaches a temperature at which the first material sheet 20 can be plastically deformed. Typically, the first material sheet 20 is deformed into a semi-circle like shape typically formed by blowing air centrally on the first material sheet 20 while the first material sheet 20 has its edges clamped down by clamp 21 to hold the edges in place, as shown in the dashed lines in FIG. 2A. The first material sheet 20 is then lowered onto a top perimeter 27 of the first forming tool 24. The edges of the first material sheet 20 are configured to be clamped onto the flanges 28 of the first forming tool 24. The flanges 28 are typically comprised of the sidewalls 31 of the first forming tool 24. A vacuum is then used to thermoform the first material sheet 20 over the first forming tool 24 to form the first intermediate structure 30 (shown in FIG. 2B).

Next, as shown in FIG. 2B, the first intermediate structure 30 is aligned over a second forming mold 50. As also shown in FIG. 2B, the first intermediate structure 30 has a base sidewall 32 defining a generally quadrilateral perimeter 34 and a plurality of first sidewalls 36, typically four sidewalls, extending transversely from the quadrilateral perimeter 34 in order to define a cavity 38 which has an opening 40 that opens in a first direction and defines a peripheral edge 42 extending around the opening 40. The opening 40 of the cavity 38 of the first intermediate structure 30 is aligned with a second forming tool 50. The second forming tool 50 is typically comprised of a base sidewall 55 and sidewall portions 52 which define a plurality of generally rectangular outwardly facing surfaces 54 and a plurality of generally rectangular inwardly facing surfaces 56, and at least one end surface 58 extending transversely between the inwardly 56 and outwardly 54 facing surfaces. The second forming tool 50 includes vacuum holes 53 to help form the first intermediate structure 30 onto the second forming tool 50 in order to produce a second intermediate structure 60 (FIG. 2C).

As shown in FIG. 2B, the first intermediate structure 30 is heated to a temperature at which it can plastically deform. The first intermediate structure 30 is then formed over the second forming mold 50 using vacuum holes 53 to help form the second intermediate structure 60. Optionally, a third forming tool 80 may be utilized. The third forming tool 80 is configured to engage the second forming tool 50 in order to help form the second intermediate structure 60. The third forming tool 80 is typically an opposite version of the second forming tool 50. For example, if the second forming tool 50 is a female mold, the third forming tool 80 is a corresponding male mold, and vice versa.

FIG. 2C shows the second intermediate structure 60. The second intermediate structure 60 typically includes a base sidewall 62 and a plurality of inner sidewalls 64 extending transversely from the base sidewall 62 and defining a second cavity 66 that opens in a second direction that is substantially opposite the first direction. The inner sidewalls 64 are spaced apart inwardly from the first sidewalls 36 to define an annular space 70 that opens in the first direction. Next, a second material sheet 22 (FIG. 2D) is sealingly connected to the second intermediate structure 60. The second material sheet 22 is extended across the peripheral edge of the second intermediate structure 60 in order to substantially close off the opening 40 of the second intermediate structure 60 and form an annular space 70. As shown in FIG. 2E, the porous insulation material 90 is typically inserted and compacted to a density to withstand atmospheric pressure into the annular space 70 through at least one opening hole 92 typically located on the second material sheet 22. Additionally, the second material sheet 22 may have additional holes 94 in order to let air exit out of the annular space 70. Alternatively, pre-formed and compacted insulation material 90 may be inserted into the annular space 70 of the second intermediate structure 60 prior to the sealing of the second material sheet 22. Once the insulation material 90 is inserted and the second material sheet 22 is sealingly connected to the second intermediate structure 60, a vacuum is used, typically in holes 92 and 94, in order to form a vacuum within the annular space 70 and sealed to produce a vacuum insulated cabinet 10 (FIG. 2F). Moreover, as shown in FIG. 2F, a sheet wrapper 100 may optionally be disposed over the vacuum insulated structure 10 in order to provide additional structural support. The sheet wrapper 100 is typically comprised of steel and is generally quadrilateral in shape having an opening 102 on one side configured to receive the vacuum insulated cabinet 10.

FIGS. 3A-3D show an alternate embodiment of the present invention. FIG. 3A shows a first forming tool 24A having a base sidewall 29A defining a generally quadrilateral perimeter and a plurality of sidewalls 31A extending transversely from the quadrilateral perimeter in order to define a cavity 33A having an opening 35A that opens in a second direction. As shown in FIGS. 2A and 3A, the first forming tool may be a male type mold structure 24 or a female type mold structure 24A. A first material sheet 20 (FIG. 3A) is plastically deformed through heating the first material sheet 20A which allows the first material sheet 20A to form a first intermediate structure 30A utilizing the first forming tool 24A. Edges of the first material sheet 20A are clamped to flanges 28A or transversely extending sidewalls 31A by clamp 21A in order to form the first intermediate structure 30*a*. Once the first intermediate structure 30A is formed, it typically comprises a base sidewall 32A defining a generally quadrilateral perimeter 34A and a plurality of sidewalls 36A extending transversely from the quadrilateral perimeter 34A in order to define a cavity 38A having an opening 40A that opens in the second direction.

Next, a second forming tool 50A (FIG. 3C) is disposed inside of the cavity 38A of the first intermediate structure 30A. The second forming tool 50A typically has sidewall portions 52A defining a plurality of generally rectangular outwardly facing surfaces 54A and inwardly facing surfaces 56A and at least one end surface 58A extending transversely between the inwardly facing surfaces 56A and outwardly facing surfaces 54A. Moreover, the second forming tool 50A includes a cavity 57A defined by surface 56B of the at least one base sidewall 55A and the inwardly facing surfaces 56A that opens in the first direction. Once the second forming tool 50A is engaged with the first intermediate structure 30A, the first intermediate structure 30A is plastically deformed using a vacuum system to produce a second intermediate structure 60A (FIG. 4). The second intermediate structure 60A typically has a base wall 62A and inner sidewalls 64A extending transversely from the base wall 62A defining a second cavity 66A that opens in the first direction. The inner sidewalls 64A are spaced apart inwardly from the first sidewalls 36A in order to define an annular space 70A. In the embodiment shown in FIGS. 3A-3D, the second forming tool 50A is comprised of pre-formed and compacted highly porous insulation material 90A. The insulation material 90A is configured to be solid enough to withstand atmospheric pressure when evacuated and to allow the first intermediate structure 30A to be formed over the insulation material 90A to produce the second intermediate structure 60A. In the embodiment shown in FIG. 3C, the second forming tool 50A remains within the annular space 70A, and is sealed inside by the second material sheet 22A. The second material sheet 22A is sealingly connected to the second intermediate structure 60A around an edge of the base sidewall 62A of the second intermediate structure 60A. As shown in FIG. 3D, air can then be evacuated from the structures shown in FIG. 3C via holes 92A, 94A in order to produce a vacuum insulated cabinet 10A.

As shown in FIG. 4, the insulation material 90A may be inserted into the second intermediate structure prior to the covering of the structure 60A with the second material sheet 22A. The insulation material 90A may be inserted in such a way that it forms a semi-circle shape rising above the cavity 66*a* in the second intermediate structure 60A. The second material sheet 22A is configured to compact the insulation material 90A to a desired compaction level during the sealing process. The addition and compaction steps can be repeated as desired to reach the desired compaction level of the insulation material 90A to withstand atmospheric pressure when the annular cavity is which contains material 90A is evacuated. The insulation material 90A is typically a highly porous granular insulation such as fumed silica or an open cell polyurethane foam or may be any other insulation material 90A known to one of ordinary skill in the art. Any ambient air is then evacuated from the annular space 70A forming a vacuum insulated cabinet 10A. The processes described above result in less thinning of the first 20A and second 22A material sheets in order to ensure that the first material sheet 20A and the second material sheet 22A remain intact in order to provide a vacuum insulated structure.

The invention claimed is:
1. A method of forming a vacuum insulated refrigerator cabinet, the method comprising:
   providing first and second sheets of material comprising at least a first layer of thermoplastic material that is at least partially permeable to oxygen, nitrogen and water vapor, and a second layer of material that is substantially impermeable to oxygen, nitrogen and water vapor;

heating at least a portion of the first sheet of material to a temperature at which the first sheet of material can be plastically deformed;

utilizing a first forming tool to deform the first sheet of material and form a first intermediate structure having a base sidewall defining a generally quadrilateral perimeter and four first sidewalls extending transversely from the quadrilateral perimeter to define a cavity having an opening that opens in a first direction and defines a peripheral edge extending around the opening;

providing a second forming tool having sidewall portions defining four generally rectangular outwardly facing surfaces and four generally rectangular inwardly facing surfaces, and an end surface extending transversely between the inwardly and outwardly facing surfaces;

disengaging the first intermediate structure from the first forming tool, followed by positioning the second forming tool in the cavity of the first intermediate structure;

plastically deforming the base sidewall to form a second intermediate structure having a base sidewall and four inner sidewalls extending transversely from the base sidewall and defining a second cavity that opens in a second direction that is substantially opposite the first direction, wherein the inner sidewalls are spaced apart inwardly from the first sidewalls to define an annular space that opens in the first direction;

filling the annular space with a highly porous insulating material;

sealingly connecting the second sheet of material to the second intermediate structure around the peripheral edge to substantially close off the opening; and forming a vacuum in the annular space containing the insulation material.

2. The method of claim 1, wherein:
the second sheet of material is spaced apart from the base sidewall of the second intermediate structure to form a central space that is connected to the annular space.

3. The method of claim 1, wherein:
the second forming tool comprises compacted porous insulation material; and
at least a portion of the second forming tool is disposed in the annular cavity while a vacuum is formed in the annular space.

4. The method of claim 1, further comprising;
blowing air in the first direction on the first sheet of material to form a semi-circle shape.

5. The method of claim 1, further comprising;
clamping at least one edge of the first sheet of material to at least one flange of the first forming tool, wherein the at least one flange is comprised of at least one sidewall of the first forming tool.

6. The method of claim 1, wherein:
the first forming tool includes at least one vacuum channel.

7. The method of claim 6, wherein;
the first forming tool is a male mold.

8. The method of claim 6, wherein;
the first forming tool is a female mold.

9. A method of forming a vacuum insulated refrigerator cabinet, the method comprising:
providing first and second sheets of material comprising at least a first layer of thermoplastic material that is at least partially permeable to oxygen, nitrogen and water vapor, and a second layer of material that is substantially impermeable to oxygen, nitrogen and water vapor;

heating at least a portion of the first sheet of material to a temperature at which the first sheet of material can be plastically deformed;

utilizing a first forming tool to deform the first sheet of material and form a first intermediate structure having a base sidewall and a plurality of first sidewalls extending transversely from the base sidewall to define a cavity having an opening that opens in a first direction and defines a peripheral edge extending around the opening;

providing a second forming tool having sidewall portions defining a plurality of generally rectangular outwardly facing surfaces and a plurality of generally rectangular inwardly facing surfaces, and at least one end surface extending transversely between the inwardly and outwardly facing surfaces;

disengaging the first intermediate structure from the first forming tool, followed by positioning the second forming tool in the cavity of the first intermediate structure;

plastically deforming the base sidewall to form a second intermediate structure having a base sidewall and a plurality of inner sidewalls extending transversely from the base sidewall, wherein the plurality of inner sidewalls are spaced apart inwardly from the first sidewalls to define an annular space;

filling the annular space with a highly porous insulating material;

sealingly connecting the second sheet of material to the second intermediate structure around the peripheral edge to substantially close off the opening; and forming a vacuum in the annular space containing the insulation material.

10. The method of claim 9, wherein:
the second sheet of material is spaced apart from the base sidewall of the second intermediate structure to form a central space that is connected to the annular space.

11. The method of claim 9, wherein:
the second forming tool comprises the highly porous insulating material; and
at least a portion of the second forming tool is disposed in the annular cavity while a vacuum is formed in the annular space.

12. The method of claim 9, further comprising;
blowing air in the first direction on the first sheet of material to form a semi-circle shape.

13. The method of claim 9, further comprising;
clamping at least one edge of the first sheet of material to at least one flange of the first forming tool, wherein the at least one flange is comprised of at least one sidewall of the first forming tool.

14. The method of claim 9, wherein;
the first forming tool includes at least one vacuum channel.

15. The method of claim 14, wherein;
the first forming tool is a male mold.

16. The method of claim 14, wherein;
the first forming tool is a female mold.

17. A method of forming a vacuum insulated refrigerator cabinet, the method comprising:
providing first and second sheets of material comprising at least a first layer of thermoplastic material, and a second layer of material that is substantially impermeable to oxygen, nitrogen and water vapor;

heating at least a portion of the first sheet of material to a temperature at which the first sheet of material can be plastically deformed;

utilizing a first forming tool to deform the first sheet of material and form a first intermediate structure having a base sidewall and a plurality of first sidewalls extending transversely from the base sidewall to define a cavity having an opening and defines a peripheral edge extending around the opening;

providing a second forming tool having sidewall portions defining a plurality of outwardly facing surfaces and a plurality of inwardly facing surfaces, and at least one end surface extending transversely between the inwardly and outwardly facing surfaces;

disengaging the first intermediate structure from the first forming tool, followed by positioning the second forming tool in the cavity of the first intermediate structure;

plastically deforming the base sidewall to form a second intermediate structure having a base sidewall and a plurality of inner sidewalls extending transversely from the base sidewall, wherein the plurality of inner sidewalls are spaced apart inwardly from the first sidewalk to define an annular space;

sealingly connecting the second sheet of material to the second intermediate structure around the peripheral edge to substantially close off the opening;

filling the annular space with a highly porous insulating material; and forming a vacuum in the annular space.

18. The method of claim 17, wherein;
the first forming tool includes at least one vacuum channel.
19. The method of claim 18, wherein;
the first forming tool is a male mold.
20. The method of claim 18, wherein;
the first forming tool is a female mold.

* * * * *